US005627439A

United States Patent [19]

Gregory et al.

[11] Patent Number: 5,627,439

[45] Date of Patent: May 6, 1997

[54] LIGHT BARRIER FOR REOPENING ELEVATOR DOORS

[75] Inventors: Richard A. Gregory, Chicago, Ill.; Nicholas Kassetas, Vernon, N.J.

[73] Assignee: Inventio AG, Hergiswil, Switzerland

[21] Appl. No.: 677,600

[22] Filed: Jul. 8, 1996

[51] Int. Cl.$^{6}$ .................................................. H02P 3/00

[52] U.S. Cl. ............................... 318/480; 49/25; 187/392

[58] Field of Search .................................... 318/280–286, 318/466–472, 480; 49/25, 26, 28, 138; 160/293.1, 292; 187/30, 31, 39, 40, 103–105, 131, 140

[56] References Cited

U.S. PATENT DOCUMENTS

| | | |
|---|---|---|
| 4,029,176 | 6/1977 | Mills . |
| 4,452,009 | 6/1984 | Baumeler et al. . |
| 4,888,532 | 12/1989 | Josson . |
| 5,149,391 | 9/1992 | Picado . |
| 5,276,391 | 1/1994 | Jonsson . |
| 5,315,434 | 5/1994 | Mizuno et al. . |
| 5,387,768 | 2/1995 | Izard et al. . |

FOREIGN PATENT DOCUMENTS

| | | |
|---|---|---|
| 0081110 | 6/1983 | European Pat. Off. . |

*Primary Examiner*—Jonathan Wysocki
*Attorney, Agent, or Firm*—Howard & Howard Attorneys

[57] ABSTRACT

An apparatus for detecting an object adjacent an elevator door includes a housing (47) mounted at an upper edge of a car door opening (38) and in which are mounted a plurality of short range detector pairs (50) and a plurality of long range detector pairs (53). Each short range detector pair includes a transmitter (14,25,40) for generating a relatively short range infrared beam (18,27,42) toward a path of travel (16) of an elevator door (17) across the door opening and a short range receiver (15,26,41) for detecting a reflection (31) of the beam from a facing surface (**17*b*) of the door and generating a short range beam detection signal. Each long range detector pair is positioned adjacent an associated one of the short range detector pairs and includes a transmitter (19,28,43) for generating a relatively long range infrared beam (21,30,45) across the path of travel and a receiver (20,29,44) for detecting a reflection (23) of the beam from an object (22) near the door opening and generating a long range beam detection signal. A control (11**) is connected to each detector pair for turning on the transmitters and for reopening the closing door in response to the long range beam detection signal. The control responds to each short range detection signal during closing of the door to disable the associated long range transmitter and responds to termination of the short range detection signal during opening of the door to enable the associated long range transmitter to prevent detection of the moving door by the long range receivers from reopening the door.

20 Claims, 3 Drawing Sheets

LIGHT BARRIER FOR REOPENING ELEVATOR DOORS

BACKGROUND OF THE INVENTION

The present invention relates generally to an apparatus for detecting objects adjacent open elevator doors and, in particular, to a light barrier for automatically controlling elevator car doors in response to detected objects.

The U.S. Pat. No. 4,452,009 (European Patent Specification 0 081 110) shows a light barrier having light emitting transmitters slidably mounted in grooves in the elevator car door sill and coupled to the elevator car doors for movement adjacent the leading edges of the doors. Light receivers are mounted on the upper edges of the car doors for synchronous movement with the light transmitters. The light transmitters generate vertical light beams to the light receivers for detecting objects near the door edge. The light receivers are connected to the door control to control the automatic actuation of the car doors which reopen upon detection of an object. An advantage of detection limited to the door edge is that the door control is not unnecessarily interrupted by objects far away from the door edge. However, a disadvantage is that such a light barrier will not detect objects spaced from the edges of the doors such as a person in the hallway about to enter the elevator car.

SUMMARY OF THE INVENTION

The present invention concerns an apparatus for detecting objects adjacent an elevator door including a first plurality of short range detector pairs mounted in spaced apart relationship along a path of travel of an elevator door across a door opening, a second plurality of long range detector pairs mounted along the path of travel of the elevator door, and a control means connected to the short and long range detector pairs. Each of the short range detector pairs includes a short range beam transmitter for generating a relatively short range infrared beam toward the path of travel and generating a short range beam detection signal upon detection of the reflection of the short range beam from the surface of the door. Each of the long range detector pairs is positioned adjacent an associated one of the short range detector pairs and includes a long range beam transmitter for generating a relatively long range infrared beam across the path of travel and a long range receiver for generating a long range beam detection signal upon detection of the reflection of the long range beam from an object near the door opening. The control means turns on the transmitters to generate the beams, responds to each long range detection signal generated by the long range receivers during closing of the door by reopening the door, responds to each short range detection signal generated by the short range receivers during closing of the door by turning off the associated one of the long range transmitters and responds to termination of each of the short range detection signals generated by the short range receivers during opening of the door by turning on the associated one of the long range transmitters.

The control means generates a plurality of control signals each turning on and off an associated one of the transmitters which control signals are cyclicly generated in a predetermined sequence. Each of the detector pairs includes at least one shield for shaping and directing the beams and/or at least one lens for shaping and directing the beams. A housing is provided for mounting the detector pairs adjacent an upper edge of the door opening. The housing includes an upper wall attached to a rear wall, a pair of end caps attached to opposite ends of the upper wall and the rear wall and a transparent cover releasably attached to the end caps, the upper wall and the rear wall and enclosing the detector pairs in the housing.

It is an object of the present invention to decrease the time required for loading an elevator car by preventing objects away from the door edge from interrupting the door travel.

It is another object of the present invention to provide an elevator light barrier which is modular in design to reduce the cost and installation time.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is an exploded perspective view of the light barrier apparatus shown in the FIG. 4; and

FIG. 6 is a wave form diagram of signals generated in the light barrier apparatus shown in the FIG. 1.

DESCRIPTION OF THE PREFERRED EMBODIMENT

Figure 1:
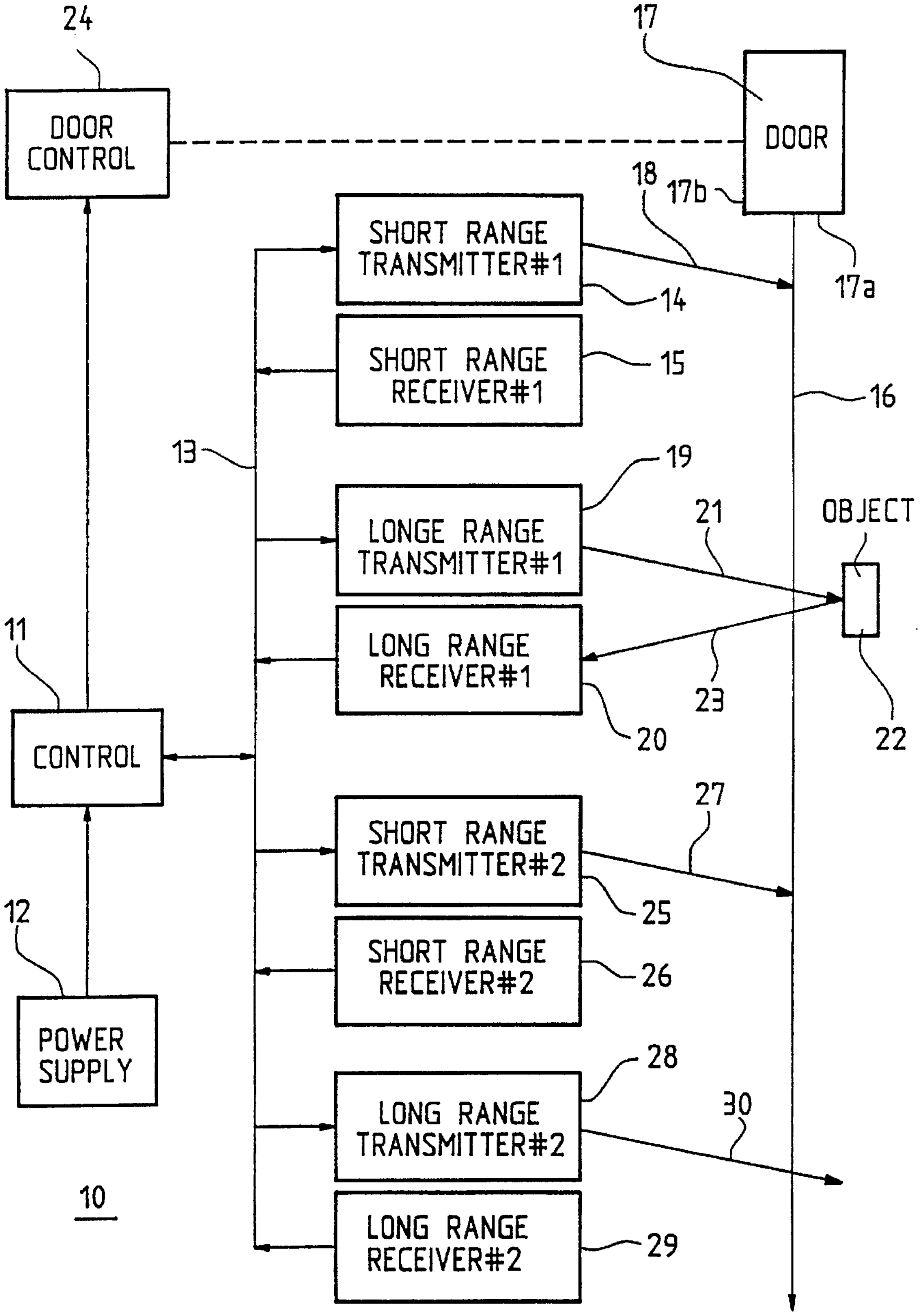
FIG. 1 is a schematic block diagram of an object detecting elevator light barrier apparatus in accordance with the present invention.

There is shown in the FIG. 1, an elevator door control system including a light barrier apparatus 10 for detecting objects in the doorway of an elevator car. The system 10 includes a light barrier control means 11 having an input connected to an output of a power supply 12. The control 11 also has an input/output connected to a signal bus 13 for generating control signals to turn on and off a plurality of infrared transmitters and for receiving detection signals from a plurality infrared receivers. For example, a first short range transmitter 14 has an input connected to the bus 13 and an associated first short range receiver 15 has an output connected to the bus 13. The transmitter 14 and the receiver 15 form a short range infrared detector pair which is positioned adjacent a path of travel 16 of an elevator car door 17 having a leading edge **17*a*. The detector pair 14 and 15 is positioned facing an inside surface 17*b* of the door 17. In response to a control signal generated on the bus 13 by the control means 11, the short range transmitter 14 generates an infrared beam 18 which has a relatively short beam range which extends at least to the inside surface 17*b* of the door 17**.

Adjacent the short range detector pair 14 and 15 and spaced along the path of travel 16 is a first long range transmitter 19 having an input connected to the bus 13 and a first long range receiver 20 having an output connected to the bus 13. In response to a control signal generated on the bus 13 by the control means 11, the first long range transmitter 19 generates an infrared beam 21 having a relatively long beam range which extends beyond the path of travel 16. When the beam 21 strikes an object 22 near the path of travel 16, a reflected beam 23 is generated to the long range receiver 20. The long range receiver 20 responds to the reflected beam 23 by generating a long range beam detection signal on the bus 13 to the control 11. The control 11 has an output connected to an input of a door operator 24 which is mechanically coupled to the door 17 to move the door back and forth along the path of travel 16. The control 11 responds to the detection signal generated by the receiver 20 by generating a reopen signal to the door operator 24 to stop and, if necessary, reverse the travel of the door 17 to prevent the door leading edge 17*a* from striking the object 22 should the object move into the path of travel 16.

A second short range transmitter 25 has an input connected to the bus 13 and an associated second short range receiver 26 has an output connected to the bus 13. The second short range transmitter 25 generates a short range infrared beam 27 which is similar to the infrared beam 18. The transmitter 25 and the receiver 26 are a second short range detector pair positioned along the path of travel 16 on the opposite side of the first long range detector pair 19 and 20 from the first short range detector pair 14 and 15. A second long range transmitter 28 has an input connected to the bus 13 and an associated long range receiver 29 has an output connected to the bus 13. The second long range transmitter 28 generates a long range infrared beam 30 which is similar to the beam 21. The transmitter 28 and the receiver 29 are a second long range detector pair positioned along the path of travel 16 on the opposite side of the second short range detector pair 25 and 26 from the first long range detector pair 19 and 20.

As shown, the short range transmitter/receiver detector pairs alternate with the long range transmitter/receiver detector pairs along the path of travel 16. Although only two short range detector pairs and two long range detector pairs are shown, additional detector pairs can be provided and the total number of detector pairs will depend on the desired spacing and the length of the path of travel 16.

Figure 2:
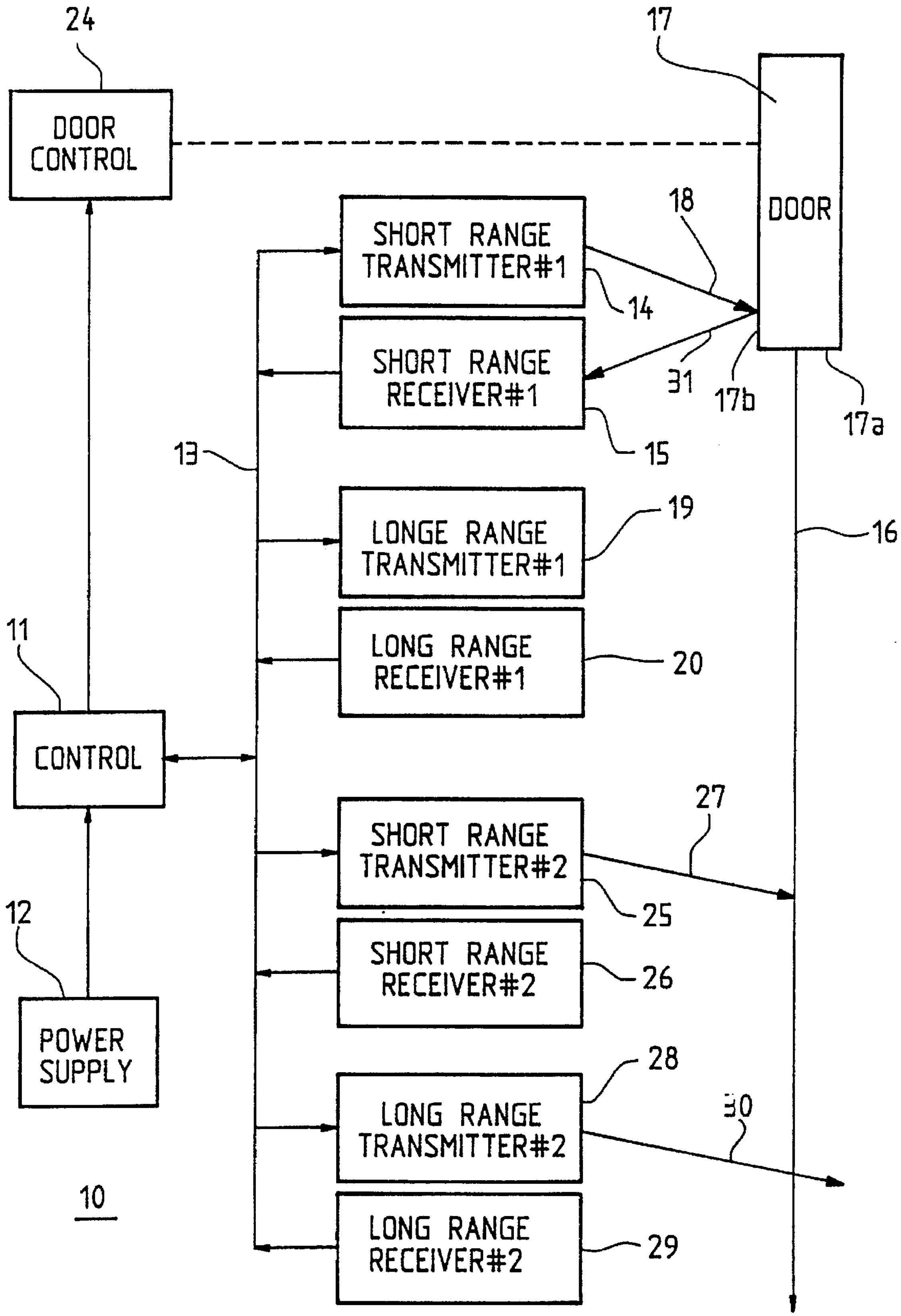
FIG. 2 is a schematic block diagram of the light barrier apparatus shown in the FIG. 1 upon detection of the moving elevator car door.

The light barrier apparatus 10 is shown in the FIG. 2 wherein the door 17 has moved along the path of travel 16 such that the short range infrared beam 18 strikes the facing surface 17*b* and generates a second reflected beam 31. The first short range receiver 15 detects the reflected beam 31 and generates a short range beam detection signal on the bus 13 to the control means 11. The control 11 responds to the detection signal from the receiver 15 by terminating the control signal to turn off the first long range transmitter 19 thereby extinguishing the first long range infrared beam 21 shown in the FIG. 1. Thus, the long range receiver 20 will not receive a reflected beam when the door 17 moves in front of the first long range transmitter 19 such that the control 11 and the door control 24 will not operate to stop and reverse the travel of the door 17 as would otherwise happen because an object (the door) was detected. In a similar manner, the second short range receiver 26 will detect a reflected beam (not shown, but similar to the beam 31) generated by the short range infrared beam 27 being reflected from the facing surface 17*b* of the door 17 to cause the control 11 to terminate the control signal to turn off the second long range transmitter 28 before the door arrives in a position adjacent to that transmitter. Accordingly, the light barrier apparatus 10 functions to sequentially shut off the long range transmitter/receiver detector pairs as the door 17 closes to permit the detection of objects in the portion of the door opening not yet covered by the closing door 17. In a similar manner, as the door is opening, each short range transmitter/receiver detector pair will turn on the adjacent just uncovered long range transmitter/receiver pair. As an alternative, the control means 11 can respond to the short range beam detection signals by ignoring any associated long range beam detection signals rather than turn off the long range beam transmitters. Thus, in response to a short range beam detection signal, the control means 11 disables the associated long range detector pair by either turning off the control signal or ignoring the associated long range beam detection signal. In response to a termination of the short range beam detection signal, the control means 11 enables the associated long range detector pair by either turning on the control signal or responding to the associated long range beam detection signal.

If the path of travel 16 of the door 17 is in a substantially horizontal direction, the short and long range infrared transmitters each generate their beams in a generally vertically extending plane perpendicular to the plane of the door. If the path of travel 16 is in a generally vertical direction, then the short and long range transmitters each generate their infrared beams in a generally horizontally extending plane perpendicular to the plane of the door 17.

Figure 3:
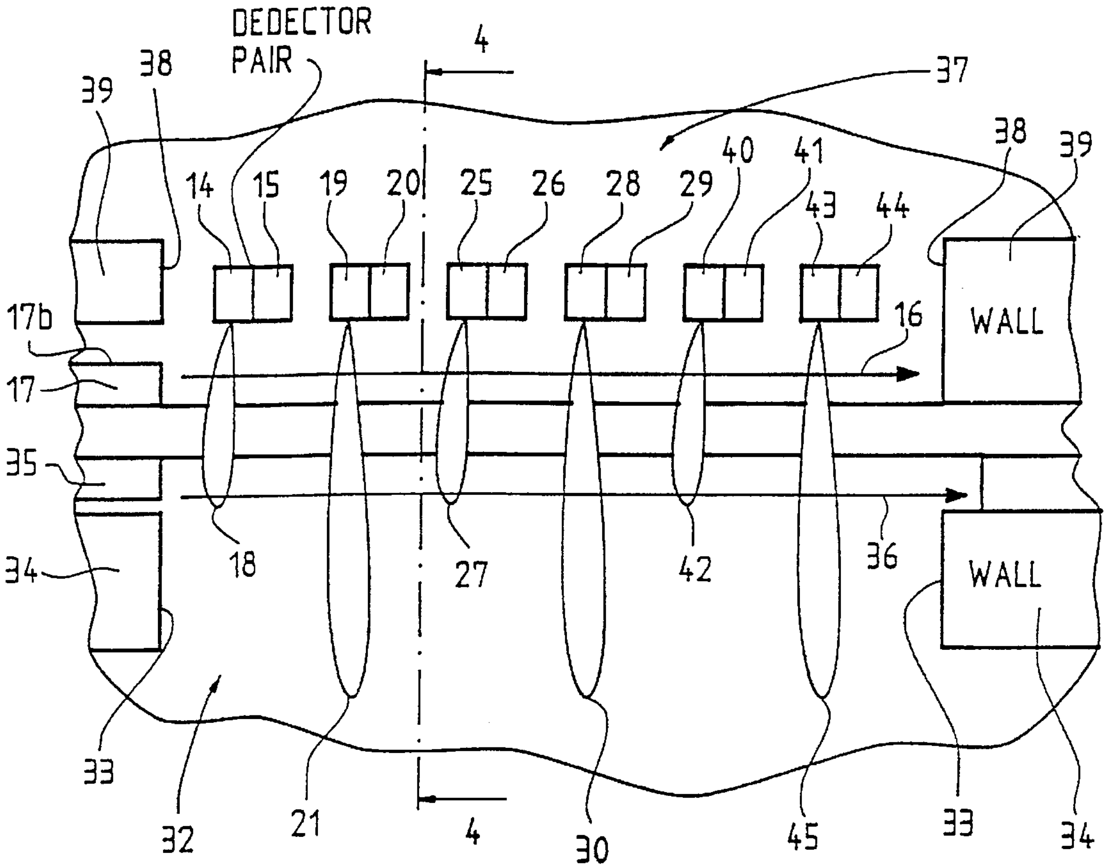
FIG. 3 is a fragmentary top plan view of an elevator car including the light barrier apparatus shown in the FIG. 1.

There is shown in the FIG. 3, a fragmentary top plan view of an elevator car having a light barrier apparatus 10 in accordance with the present invention wherein the car is stopped at a floor 32 of a building. The floor 32 includes an elevator entryway opening 33 formed in a hallway wall 34. An elevator hallway door 35 is shown in the open position and can be moved to a closed position along a path of travel 36. An elevator car 37 has a car door opening 38 formed in a front wall 39 of the car for the associated car door 17. The car door 17 is shown in the open position and can be moved along the path 16 to close the opening 38.

The first short range detector pair includes the transmitter 14 and the receiver 15, the first long range detector pair includes the transmitter 19 and the receiver 21, the second short range detector pair includes the transmitter 25 and the receiver 26, the second long range detector pair includes the transmitter 28 and the receiver 29, a third short range detector pair includes a third short range transmitter 40 and a third short range receiver 41, and a third long range detector pair includes a third long range transmitter 43 and a third long range receiver 44. The detector pairs are mounted in the opening 38 adjacent to the path of travel 16 and facing the inside surface 17*b* of the car door 17.

The transmitter 14 generates the infrared beam 18 which extends across the path of travel 16 and also across the path of travel 36 to detect both the car door 17 and the hall door 35. The first long range transmitter 19 generates the infrared beam 21 across the paths of travel 16 and 36 and through the opening 33 to detect objects and persons approaching the doors 17 and 35 from the building hallway. In a similar manner, the second short range transmitter 25 generates the beam 27 and the second long range transmitter 28 generates the beam 30. The third short range transmitter 40 is associated with the third short range receiver 41 and generates a short range infrared beam 42. The third long range transmitter 43 is associated with the third long range receiver 44 and generates a long range infrared beam 45. The three short range detector pairs and the three long range detector pairs are for illustration purposes only and additional detector pairs can be provided dependent upon the desired spacing between adjacent and the length of the paths of travel 16 and 36 to assure that objects of at least a minimum size can be detected across the widths of the openings 33 and 38.

Figure 4:
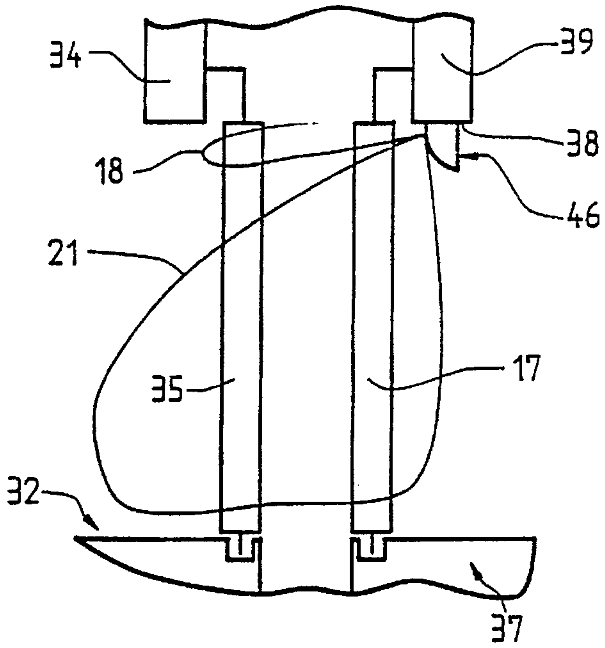
FIG. 4 is a fragmentary cross-sectional view taken along the line 4—4 in the FIG. 3.

As shown in the FIG. 4, a detection assembly 46 is mounted on a downwardly facing surface of the elevator car door opening 39 in the opening 38. The short range infrared beam 18 extends from the assembly 46 across an upper portion of the car door 17 and the hall door 35. Thus, the beam 18 is relatively small in area and will not be reflected by persons and objects entering the car 37 from the hall 32 as they generally will pass under the short range beam. On the other hand, the long range beam 21 is extensive in area and extends into the hall beyond the wall 34 and extends adjacent to the bottom edges of the doors 17 and 35. Thus, the beam 21 will be reflected by any person or object entering the car 37 from the hall.

The detection assembly 46 is shown in more detail in the FIG. 5. The detection assembly 46 includes a housing 47 which is generally L-shaped in cross section having a generally horizontally extending upper wall 47*a* and a generally vertically extending back wall 47*b* joined together at a longitudinal edge of each. Attached at opposite ends of the housing 47 are a pair of end caps 48 each having a curved edge 48*a*. The housing 47 is closed by a transparent front cover 49 which is curved to correspond to the curved edges 48*a* of the end caps 48 and is attached thereto. A short range detector pair transmitter/receiver module 50 includes the first short range transmitter 14 and the first short range receiver 15. The module 50 is constructed so that side wall shields 51 and/or a curved lens 52 shape the infrared beam 18 in the manner desired which beam is transmitted through the transparent cover 49. A long range detector pair transmitter/receiver module 53 includes the first long range transmitter 19 and the first long range receiver 20. The module 53 is constructed so that side wall shields 54 and/or a curved lens 55 shape the infrared beam 21 in the manner desired which beam is transmitted through the transparent cover 49. Similar modules (not shown) are provided for each of the detector pairs utilized.

The proximity of the infrared transmitters and receivers to one another could cause "cross talk" wherein the beam generated by one transmitter is received not only by its associated receiver but also by a receiver of an adjacent one of the detector pairs. In order to prevent "cross talk", the beams can be pulsed on and off in a time sequenced manner. For example, there is shown in the FIG. 6 a waveform diagram of the control signals generated by the control means 11 for the transmitters and beams shown in the FIG. 3. The short range transmitter 14 is turned on by a control signal 18*a* from the control 11 to generate the beam 18 for a first period of time and then is turned off. Next, the long range transmitter 19 is turned on by a control signal 21*a* to generate the beam 21 which is then turned off. In sequence, the short range transmitter 25 is turned on and off by a control signal 27*a* to generate the beam 27. Subsequently, the long range transmitter 28 is turned on and off by a control signal 30*a* to generate the beam 30, the short range transmitter 14 is turned on and off by a control signal 42*a* to generate the beam 42 and the long range transmitter 43 is turned on and off by a control signal 45*a* to generate the beam 45 in sequence. After the beam 45 is terminated, the control means 11 repeats the cycle of control signals. Thus, the control signals are generated in sequence in cycles whereby only one transmitter is on at any one time and the control means 11 can ignore any detection signals from any receivers other than the receiver associated with the transmitter which is turned on.

Another problem with infrared receivers is false detections due to ambient light containing infrared rays. Such problem can be avoided by coding the control signals. For example, as shown in the FIG. 6, a control signal 18*b* is formed of three pulses spaced within an "on" period. Thus, the transmitter 14 will generate the beam 18 as three pulses of infrared light and the control 11 must receive a pulsed detection signal from the receiver 15 having the same frequency to recognize a valid detection signal. Control signals 21*b*, 27*b*, 30*b*, 42*b* and 45*b* can be coded in a similar manner. The control signal coding can be any known form of frequency or pulse width modulation and each control signal can be coded differently. Different coding could eliminate the cross talk problem.

Also, the spacing between the detector pairs 50 and the spacing between the detector pairs 53 can be such that it is not necessary to turn on only one detector pair at a time as shown with the control signals 18*a*, 21*a*, 27*a*, 30*a*, 42*a* and 45*a*. For example, it may be possible to turn on all of the short range detector pairs 50 at one time as shown by the control signals 18*b*, 27*b* and 42*b* and to turn on all of the long range detector pairs 53 at another time as shown by the control signals 21*b*, 30*b* and 45*b*. Other combinations are possible depending upon the required spacing between active transmitters.

The detector assembly 46 can sequence from the left to the right or from the right to the left depending upon the direction of operation of the door 17. If the elevator car doors and the hall doors are of the center opening type, the detection assembly 46 can be operated to sequence from the center toward both end caps 48. The modular design of the detector assembly 46 permits the housing 47 to be formed as an extrusion and cut to length to accommodate the width of the opening 38. The detector assembly 46 can be installed on existing elevator cars wherein the mechanical edge detectors can be retained for backup purposes.

In summary, the present invention is an apparatus for detecting objects adjacent an elevator door comprising a first plurality of the short range detector pairs 50 adapted to be mounted in spaced apart relationship along the path of travel 16 of the elevator door 17 across the door opening 38, a second plurality of the long range detector pairs 53 adapted to be mounted along the path of travel of the elevator door, and the control means 11 connected to each of the short range detector pairs 50 and each of the long range detector pairs 53. Each of the short range detector pairs 50 includes one of the short range beam transmitters 14, 25 and 40 for generating the relatively short range infrared beams 18, 27 and 42 toward the path of travel 16 and one of the short range receivers 15, 26 and 41 for detecting the reflection 31 of the short range beam from the facing surface 17*b* of the door 17 and generating the short range beam detection signal. Each of the long range detector pairs 53 is positioned adjacent an associated one of the short range detector pairs 50 and includes one of the long range beam transmitters 19, 28 and 43 for generating the relatively long range infrared beams 21, 30 and 45 across the path of travel 16 and one of the long range receivers 20, 29 and 44 for detecting the reflection 23 of the long range beam from the object 22 near the door opening 38. The control means 11 turns on the transmitters 14, 19, 25, 28, 40 and 43 to generate the beams 18, 21, 27, 30, 42 and 45 and responds to each short range detection signal generated by the short range receivers 15, 26 and 41 during closing of the door 17 by turning off the associated one of the long range transmitters 19, 25 and 40 and responds to termination of each of the short range detection signals during opening of the door by turning on the associated one of the long range transmitters.

The control means 11 generates the plurality of control signals 18*a*, 21*a*, 27*a*, 30*a*, 42*a* and 45*a*, each control signal turning on and off an associated one of the transmitters 14, 19, 25, 28, 40 and 43, which control signals are cyclicly generated in a predetermined sequence. Each of the detector pairs 50 and 53 includes at least one shield 51 and 54 for shaping and directing the beams 18, 21, 27, 30, 42 and 45 and/or at least one lens 52 and 55 for shaping and directing the beams. The housing 47 is provided for mounting the detector pairs 50 and 53 adjacent an upper edge of the door opening 38. The housing 47 includes the upper wall 47*a* attached to the rear wall 47*b*, the pair of end caps 48 attached to opposite ends of the upper wall 47*a* and the rear wall 47*b* and the transparent cover 49 releasably attached to the end caps 48, the upper wall 47*a* and the rear wall 47*b* enclosing the detector pairs 50 and 53 in the housing 47.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for reopening a closing door upon detecting an object adjacent a door opening comprising:

a short range detector pair (50) adapted to be mounted along a path of travel (16) of a door (17) across a door opening (38), said short range detector pair (50) including a short range beam transmitter (14) for generating a relatively short range infrared beam (18) toward the path of travel (16) and a short range receiver (15) for detecting a reflection (31) of said short range beam (18) from a facing surface (17*b*) of the door (17) and generating a short range beam detection signal;

a long range detector pair (53) adapted to be mounted adjacent said short range detector pair (50) along the path of travel (16) of the door (17) whereby the door (17) passes said short range detector pair (50) before passing said long range detector pair (53) as the door (17) closes the door opening (38), said long range detector pair (53) including a long range beam transmitter (19) for generating a relatively long range infrared beam (21) across the path of travel (16) and a long range receiver (20) for detecting a reflection (23) of said long range beam (21) from an object (22) near the door opening (38) and generating a long range beam detection signal; and a control (11) connected to said short range detector pair (50) and said long range detector pair (53) for turning on said transmitters (14,19) to generate said beams (18,21), said control means (11) responding to said long range beam detection signal generated by said long range receiver (20) during closing of the door (17) by generating a reopen signal to a door control (24) controlling movement of the door (17), said control (11) responding to said short range beam detection signal generated by said short range receiver (15) during closing of the door (17) by disabling said long range detector pair (53) and responding to termination of said short range beam detection signal generated by said short range receiver (15) during opening of the door (17) for enabling said long range detector pair (53).

2. The apparatus according to claim 1 wherein said control means (11) disables said long range detector pair (53) by turning off a control signal (21*a*) and enables said long range detector pair (53) by turning on said control signal (21*a*).

3. The apparatus according to claim 1 wherein said control means (11) disables said long range detector pair (53) by ignoring said long range beam detection signal and enables said long range detector pair (53) by responding to said long range beam detector signal.

4. An apparatus for detecting objects adjacent an elevator door to control movement of the elevator door comprising:

a plurality of short range detector pairs (50) adapted to be mounted in spaced apart relationship along a path of travel (16) of an elevator door (17) across a door opening (38), each said short range detector pair (50) including a short range beam transmitter (14,25,40) for generating a relatively short range infrared beam (18, 27,42) toward the path of travel (16) and a short range receiver (15,26,41) for detecting a reflection (31) of said short range beam (18,27,42) from a facing surface (17*b*) of the door (17) and generating a short range beam detection signal;

a plurality of long range detector pairs (53) adapted to be mounted along the path of travel (16) of the elevator door (17), each said long range detector pair (53) being positioned adjacent an associated one of said short range detector pairs (50), each said long range detector pair (53) including a long range beam transmitter (19,28,43) for generating a relatively long range infrared beam (21,30,45) across the path of travel (16) and a long range receiver (20,29,44) for detecting a reflection (23) of said long range beam (21,30,45) from an object (22) near the door opening (38) and generating a long range beam detection signal; and a control means (11) connected to each of said short range detector pairs (50) and each of said long range detector pairs (53) for turning on said transmitters (14,19,25, 28,40,43) to generate said beams (18,21,27,30,42,45), said control means (11) responding to each said long range beam detection signal generated by said long range receivers (20,29,44) during closing of the door (17) for generating a reopen signal to a door control (24) controlling movement of the door (17), said control means (11) responding to each said short range beam detection signal generated by said short range receivers (15,26,41) during closing of the door (17) for disabling said associated long range detector pair (53) and responding to termination of each said short range beam detection signal generated by said short range receivers (15,26,41) during opening of the door (17) for enabling said associated long range detector pair (53).

5. The apparatus according to claim 4 wherein said control means (11) generates a plurality of control signals (18*a*,21*a*,27*a*,30*a*,42*a*,45*a*) each turning on and off an associated one of said transmitters (14,19,25,28,40,43).

6. The apparatus according to claim 5 wherein said control means (11) cyclically generates said control signals (18*a*,21*a*,27*a*,30*a*,42*a*,45*a*) in a predetermined sequence.

7. The apparatus according to claim 4 wherein said control means (11) generates a plurality of coded control signals (18*b*,21*b*,27*b*,30*b*,42*b*,45*b*) each turning on and off an associated one of said transmitters (14,19,25,28,40,43).

8. The apparatus according to claim 7 wherein said control means (11) cyclically generates said coded control signals (18*b*,21*b*,27*b*,30*b*,42*b*,45*b*) in a predetermined sequence.

9. The apparatus according to claim 4 wherein each said detector pair (50,53) includes at least one shield (51,54) for shaping and directing said beams (18,21,27,30,42,45).

10. The apparatus according to claim 4 wherein each said detector pair (50,53) includes at least one lens (52,55) for shaping and directing said beams (18,21,27,30,42,45).

11. The apparatus according to claim 4 including a housing (47) for mounting said detector pairs (50,53) adjacent an upper edge of the door opening (38).

12. The apparatus according to claim 11 wherein said housing (47) includes an upper wall (47*a*) attached to a rear wall (47*b*), a pair of end caps (48) attached to opposite ends of said upper wall (47*a*) and said rear wall (47*b*) and a transparent cover (49) releasably attached to said end caps (48), said upper wall (47*a*) and said rear wall (47*b*) enclosing said detector pairs (50,53) in said housing (47).

13. The apparatus according to claim 4 wherein said control means (11) disables said associated long range detector pair (53) by turning off a control signal (21*a*,30*a*,45*a*,21*b*,30*b*,45*b*) and enables said associated long range detector pair (53) by turning on said control signal (21*a*,30*a*,45*a*,21*b*,30*b*,45*b*).

14. The apparatus according to claim 4 wherein said control means (11) disables said associated long range detector pair (53) by ignoring said long range beam detection signal and enables said associated long range detector pair (53) by responding to said long range beam detector signal.

15. An apparatus for detecting an object adjacent an elevator door comprising:

a housing (47) including an upper wall (47*a*) attached to a rear wall (47*b*);

a pair of end caps (48) attached to opposite ends of said upper wall (47*a*) and said rear wall (47*b*);

a transparent cover (49) releasably attached to said end caps (48), said upper wall (47*a*) and said rear wall (47*b*) closing said housing (47);

a plurality of short range detector pairs (50) mounted in said housing (47), each said short range detector pair (50) including a short range beam transmitter (14,25,40) for generating a relatively short range infrared beam (18,27,42) toward a path of travel (16) of an elevator door (17) across a door opening (38) and a short range receiver (15,26,41) for detecting a reflection (31) of said short range beam (18,27,40) from a facing surface (17*b*) of the door (17) and generating a short range beam detection signal;

a plurality of long range detector pairs (53) mounted in said housing (47), each said long range detector pair (53) being positioned between an adjacent pair of said short range detector pairs (50) and including a long range beam transmitter (19,28,43) for generating a relatively long range infrared beam (21,30,45) across the path of travel (16) and a long range receiver (20,29,44) for detecting a reflection (23) of said long range beam (21,30,45) from an object (22) near the door opening (38); and a control means (11) connected to each of said short range detector pairs (50) and each of said long range detector pairs (53) for turning on said transmitters (14,19,25,28,40,43) to generate said beams (18,21,27,30,42,45), said control means (11) responding to each said long range beam detection signal generated by said long range receivers (20,29,44) during closing of the door (17) for generating a reopen signal to a door control (24) controlling movement of the door (17), said control means (11) responding to each said short range beam detection signal generated by said short range receivers (15,26,41) during closing of the door (17) for disabling said associated long range detector pair (53) and responding to termination of each said short range beam detection signal generated by said short range receivers (15,26,41) during opening of the door (17) for enabling said associated long range detector pair (53).

16. The apparatus according to claim 15 wherein each said short range detector pair (50) has shields (51) positioned on opposite sides of said transmitter (14,25,40) for shaping and directing said beam (18,27,42).

17. The apparatus according to claim 15 wherein each said short range detector pair (50) has a lens (52) positioned in front of said transmitter (14,25,40) for shaping and directing said beam (18,27,42).

18. The apparatus according to claim 15 wherein each said long range detector pair (53) has shields (54) positioned on opposite sides of said transmitter (19,28,43) for shaping and directing said beam (21,30,45).

19. The apparatus according to claim 15 wherein each said long range detector pair (53) has a lens (55) positioned in front of said transmitter (19,28,43) for shaping and directing said beam (21,30,45).

20. The apparatus according to claim 15 wherein said control means (11) generates a plurality of control signals (18*a*,21*a*,27*a*,30*a*,42*a*,45*a*) each turning on and off an associated one of said transmitters (14,19,25,28,40,43), said control means (11) generating said control signals (18*a*,21*a*,27*a*,30*a*,42*a*,45*a*) cyclically in a predetermined sequence.

* * * * *